United States Patent [19]

Lin

[11] Patent Number: 5,978,818
[45] Date of Patent: Nov. 2, 1999

[54] AUTOMATED HYPERTEXT OUTLINE GENERATION FOR DOCUMENTS

[75] Inventor: Shaun Lin, Fremont, Calif.

[73] Assignee: Oracle Corporation, Redwood Shores, Calif.

[21] Appl. No.: 08/846,510

[22] Filed: Apr. 29, 1997

[51] Int. Cl.[6] .................................................. G06F 17/30
[52] U.S. Cl. .................................................. 707/501
[58] Field of Search ................................. 707/501, 500, 707/505, 530, 517, 513

[56] References Cited

U.S. PATENT DOCUMENTS

5,557,722   9/1996   DeRose et al. .......................... 395/148
5,644,776   7/1997   DeRose et al. .......................... 395/761

Primary Examiner—Stephen S. Hong
Assistant Examiner—Alford W. Kindred
Attorney, Agent, or Firm—McDermott, Will & Emery

[57] ABSTRACT

A method and apparatus for generating a hypertext-based outline for a report are described. A report definition specifying the contents and form of the report is received and evaluated to determine if any report definition statements contained in the report definition specify that a hypertext-based outline entry is to be generated. If so, then for each report definition statement specifying that a hypertext-based outline entry is to be generated, a hypertext-based outline entry is generated having a link to a location specified by the report definition statement.

20 Claims, 11 Drawing Sheets

AUTOMATED HYPERTEXT OUTLINE GENERATION FOR DOCUMENTS

FIELD OF THE INVENTION

The invention relates to database systems, and more specifically, to a method and apparatus for generating a hypertext outline for a document.

BACKGROUND OF THE INVENTION

In the context of document management, a hypertext system is a system in which a document can contain links, also known as "hyperlinks," to locations within the same document and to other documents. Two examples of well known hypertext systems are Apple Corporation's Hypercard and the World Wide Web. A program used to view and navigate through a document containing links is generally referred to as a hypertext viewer. A hypertext viewer allows a user to quickly navigate through a document containing links by highlighting text and objects associated with links. When a user selects text or an object associated with a link, the hypertext viewer automatically scrolls the document to the location specified by the link. If a selected link references a document other than the document currently being viewed, then the referenced document is automatically loaded by the hypertext viewer.

Often, the location referenced by a link contains a link tag. The hypertext viewer simply scrolls to the link tag associated with a link when the link is selected. The use of link tags allows changes to be made to the document without affecting the destination of the existing links. However, other approaches to implementing links may also be used, such as having each link reference a page number or a relative offset within a document.

One application of hypertext systems to handle large documents has been the use of a hypertext-based "contents" section at the beginning of documents. Similar to a table of contents in a book or magazine, a hypertext-based contents section contains a list of entries corresponding to sections in the document which are directly accessible by the user. By selecting one of the contents entries, the document display is automatically scrolled to the document location containing the information associated with the selected entry. Hence, a hypertext-based contents section provides a user with direct access to various locations within the document without having to sequentially scroll through all of the preceding pages in the document.

Despite the advantages a hypertext-based contents section has over scrolling through a document page by page, a hypertext-based contents section is not without its disadvantages. Specifically, once a user has jumped into a particular section of the document, the hypertext-based contents section is no longer visible to the user since the hypertext-based contents section is typically located at the beginning of the document. Consequently, the user must return to the beginning of the document so that the hypertext-based contents section will be redisplayed before another hypertext-based contents section selection can be made.

A more flexible mechanism for navigating through a document is an outline which, like the hypertext-based contents section solution, provides direct access to particular sections of the document. Specifically, a hypertext-based outline is displayed which contains a list of entries containing links to various sections in the document. The outline entries provide direct access by a user to the listed sections of the document. However, unlike the contents section which is only accessible from the beginning of the document, the hypertext-based outline always remains visible and accessible to the user, regardless of the portion of the document being displayed. Typically, the hypertext-based outline is displayed in a separate display area from the display area containing the document. For example, in one implementation, the outline is displayed in an outline display frame on the left hand side of a display device while the document is displayed in a document display frame located on the right hand side of the display device. This arrangement allows the user to browse the document either sequentially from top to bottom using the document display frame, or randomly using the outline in the outline display frame.

As with the hypertext-based contents section, selecting an outline entry causes the hypertext viewer to scroll the document to the location specified by the link associated with the selected outline entry. However, since the outline always remains visible and accessible to the user in the outline display frame, regardless of the document portion displayed in the display frame, a user may jump directly to other locations in the document using the outline without having to return to the top of the document.

Although an outline has clear advantages over a contents section, there are limitations common to both the outline and contents section. One significant limitation is the resources required to update the outline or contents section when changes are made to the associated document. When a change is made to the contents or formatting of a document, an outline or contents section associated with that document must also be updated for it to remain accurate. For example, text may be added to or deleted from the document requiring the addition or deletion of entries (and links) to the outline or contents section associated with the document. Some types of documents, such as database reports, contain many pages of information and are frequently regenerated. Maintaining outlines or contents sections for these documents can require enormous resources and can become impracticable.

In view of the benefits provided by existing hypertext systems for reviewing large documents and the resources required to maintain outlines when the associated documents are frequently updated, a method and apparatus for automatically generating hypertext-based outlines for documents is highly desirable.

SUMMARY OF THE INVENTION

According to one aspect of the invention, a method is provided for generating an outline for a document where both the outline and the document are based upon a document definition. First, the document definition is received. Then, based upon the document definition, a determination is made as to whether an outline entry is to be generated. If, based upon the document definition, an outline entry is to be generated, then an outline entry having a link to a location specified by the document definition is generated.

According to another aspect of the invention, a method is provided for generating both a hypertext-based report and a hypertext-based outline associated with the hypertext-based report where both the hypertext-based report and the hypertext-based outline are based upon a report definition. First, the report definition that includes a plurality of report definition statements is received. Then, one of the report definition statements is selected. A portion of the hypertext-based report is generated based upon the selected report definition statement. Then, a determination is made as to whether the selected report definition statement specifies that a hypertext-based outline entry is to be generated. If the selected report definition statement specifies that a hypertext-based outline entry is to be generated, then a hypertext-based outline entry having a link to a location specified by the selected report definition statement is generated. This process is then repeated for each of the remaining report definition statements in the report definition.

According to another aspect of the invention, a computer system is provided having a storage medium with the report definitions stored thereon for generating a report and a hypertext-based outline for the report. The report definition comprises a first set of data, specifying the contents and form of the report, and a second set of data, specifying the contents of the hypertext-based outline for the report, where the hypertext-based outline contains a link to a location specified by the second set of data.

BRIEF DESCRIPTION OF THE DRAWINGS

The invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for generating a hypertext-based outline for a document is described. In the following description, for the purposes of explanation, numerous specific details are set forth in order to provide a thorough understanding of the invention. It will be apparent, however, to a person of ordinary skill in the art that the invention may be practiced without these specific details. In other instances, well-known structures and devices are illustrated shown in block diagram form in order to avoid unnecessarily obscuring the invention.

HARDWARE OVERVIEW

Figure 1:
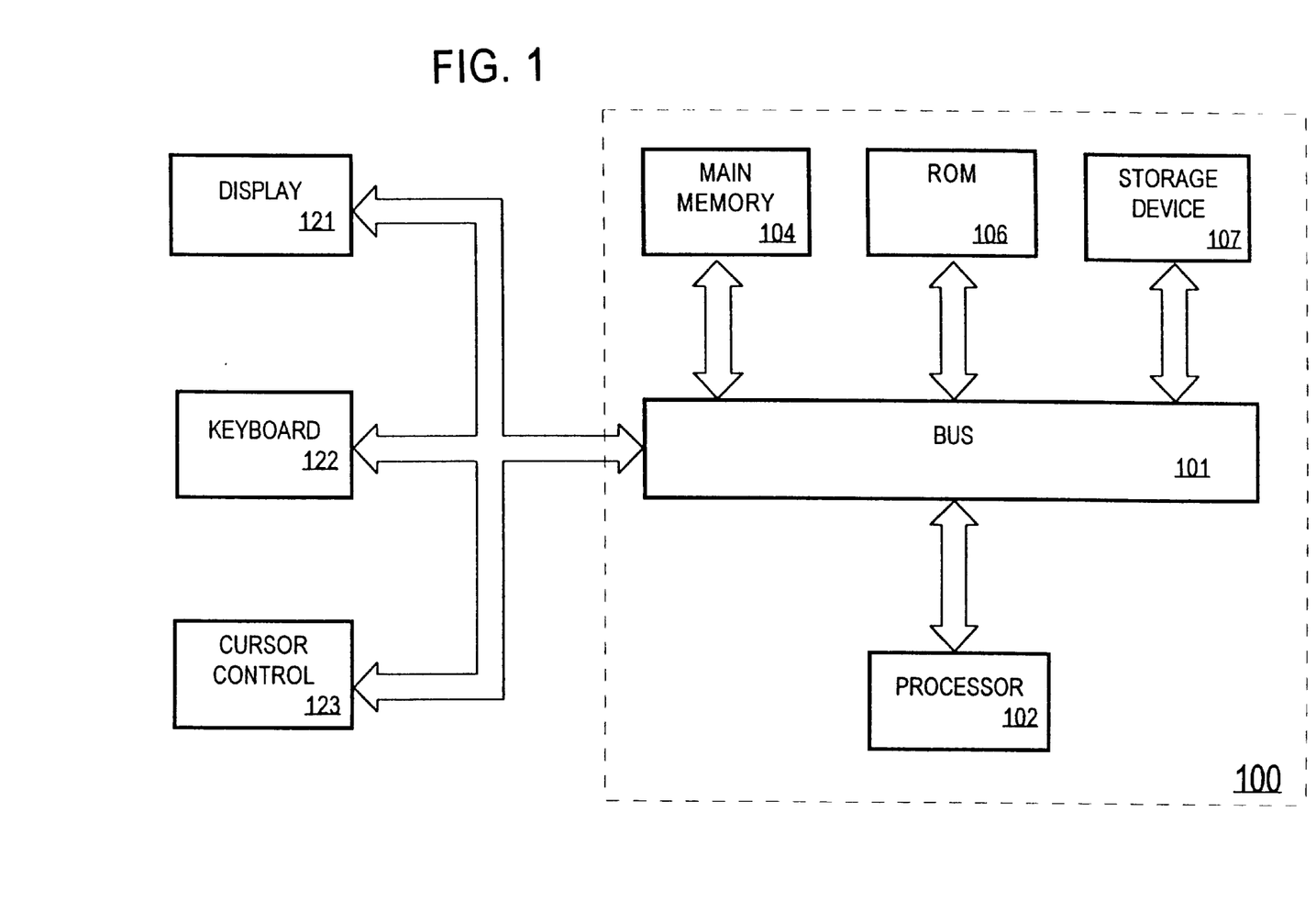
FIG. 1 is a block diagram of a computer system on which the invention may be implemented.

FIG. 1 is a block diagram of a computer system 100 upon which an embodiment of the invention may be implemented. Computer system 100 includes a bus 101 or other communication mechanism for communicating information, and a processor 102 coupled with bus 101 for processing information. Computer system 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also includes a read only memory (ROM) and/or other static storage device 106 coupled to bus 101 for storing static information and instructions for processor 102. A data storage device 107, such as a magnetic disk or optical disk, is coupled to bus 101 for storing information and instructions.

Computer system 100 may also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

The invention is related to the use of computer system 100 to generate a hypertext-based outline for a document. According to one embodiment of the invention, a hypertext-based outline is generated for a document by computer system 100 in response to processor 102 executing sequences of instructions contained in memory 104. Such instructions may be read into memory 104 from another computer-readable medium, such as data storage device 107. Execution of the sequences of instructions contained in memory 104 causes processor 102 to perform the process steps that will be described hereafter. In alternative embodiments, hard-wired circuitry may be used in place of or in combination with software instructions to implement the invention. Thus, embodiments of the invention are not limited to any specific combination of hardware circuitry and software.

FUNCTIONAL OVERVIEW

According to an embodiment of the invention, a method and apparatus are provided for generating a hypertext-based outline for a document. Although various embodiments of the invention are described hereinafter in the context of generating a hypertext-based outline for a report, the invention is applicable to generating a hypertext-based outline for other types of documents and is not intended to be limited to reports.

Some types of reports are generated by first creating a report definition and then processing the report definition with a "report engine." A report definition specifies both the contents and form of the report and, according to one embodiment of the invention, is stored in a report definition file (RDF). According to an embodiment of the invention, a report definition also specifies the particulars of any links to be included in the report as well as any outline entries to be generated for the report. A report engine is a process which processes a report definition and generates a report containing the data specified by the report definition.

Figure 2:
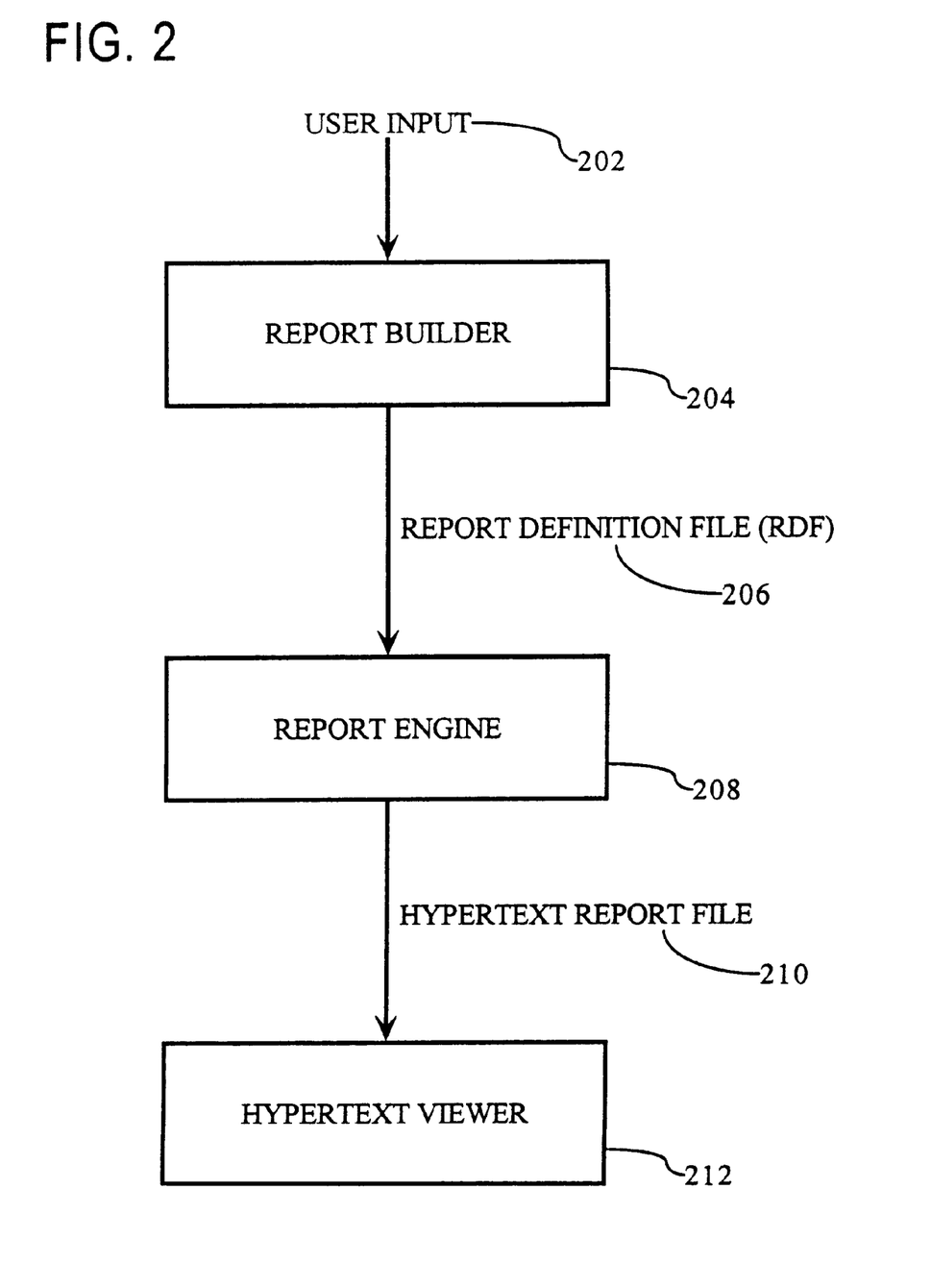
FIG. 2 is a top level flow diagram of a method for generating a hypertext-based outline for a report according to an embodiment of the invention.

The method for generating a hypertext-based outline for a report according to an embodiment of the invention is now described with reference to the top level flow diagram of FIG. 2. A user provides report and outline criteria in the form of user input 202 to a report builder 204. Report builder 204 is a visual development tool which allows a user to visually construct a report definition. Report builder 204 processes user input 202 and generates a report definition file (RDF) 206. Report definition file 206 specifies the contents and form of both the report and a hypertext-based outline associated with the report.

Report definition file 206 is processed by a report engine 208 which generates a hypertext report file 210. Hypertext report file 210 contains code which, when processed by a hypertext viewer 212, causes hypertext viewer 212 to display a report and a hypertext-based outline for the report. Viewing the report and hypertext outline using hypertext viewer 212 allows a user to browse the report page by page or to jump directly to different portions of the report by selecting links embedded in the report. A user may also select entries in the hypertext-based outline to jump directly to specified portions of the report. Every time report definition file 206 is processed by report engine 208, hypertext report file 210 containing hypertext-based outline information is automatically generated.

DETAILED DESCRIPTION

Embodiments of the invention are hereinafter described in more detail in the context of (1) generating a report definition with report builder, (2) processing a report definition with a report engine, and (3) viewing a report and hypertext-based outline with a hypertext viewer.

1. Generating a Report Definition With Report Builder

Figure 3:
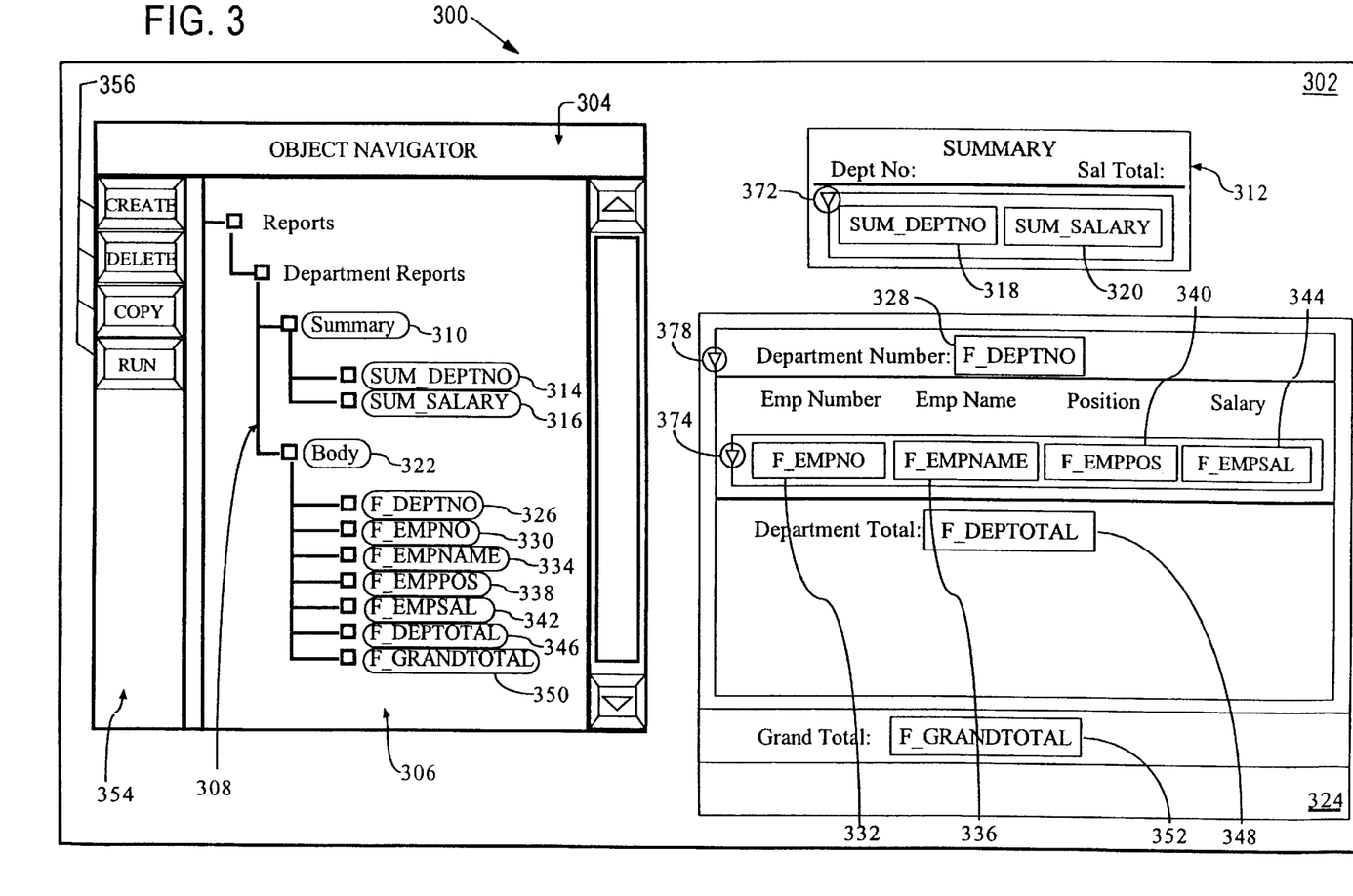
FIGS. 3 is a block diagram of a report builder tool according to an embodiment of the invention.

According to an embodiment of the invention, a report definition specifies the contents and form of both a report and a hypertext-based outline for the report, if one is to be provided. FIG. 3 illustrates an embodiment of a report builder tool 300 for generating a report definition. Report builder tool 300 includes a graphical display 302, upon which all of the visual components of report builder tool 300 are displayed. Report builder tool 300 also includes an object navigator 304, having its own graphical display 306. Graphical display 306 displays the current report object hierarchy in the form of a hierarchical tree 308.

Graphical display 302 provides a visual representation of the report objects contained in hierarchical tree 308. For example, report object summary 310, is visually represented on graphical display 302 by frame 312. As indicated by hierarchical tree 308, report object summary 310 includes two report objects, report object SUM_DEPTNO 314 and report object SUM_SALARY 316. Report object SUM_DEPTNO 314 is visually represented on graphical display 302 by report field SUM_DEPTNO 318 while report object SUM_SALARY 316 is visually represented by report field SUM_SALARY 320, both of these fields 318, 320 being contained in frame 312.

Similarly, report object body 322 is visually represented by report fields contained in frame 324. Specifically, report object F_DEPTNO 326 is visually represented by report field F_DEPTNO 328. Report object F_EMPNO 330 is visually represented by report field F_EMPNO 332. Report object F_EMPNAME 334 is visually represented by report field F_EMPNAME 336. Report object F_EMPPOS 338 is visually represented by report field F_EMPPOS 340. Report object F_EMPSAL 342 is visually represented by report field F_EMPSAL 344. Report object F_DEPTOTAL 346 is visually represented by report field F_DEPTOTAL 348. Finally, report object F_GRANDTOTAL 350 is visually represented by report field F_GRANDTOTAL 352.

Object navigator 304 also includes a toolbar 354 which includes function buttons 356 used to create new report definitions or to delete or copy existing report definitions.

Each report object listed in hierarchical tree 308 has a property palette which is accessible by either selecting the report object listed in hierarchical tree 308 or by selecting the corresponding report field displayed on graphical display 302. Each property palette lists all of the attributes for a particular report object and provides a convenient mechanism for changing the value of each attribute.

Figure 4:
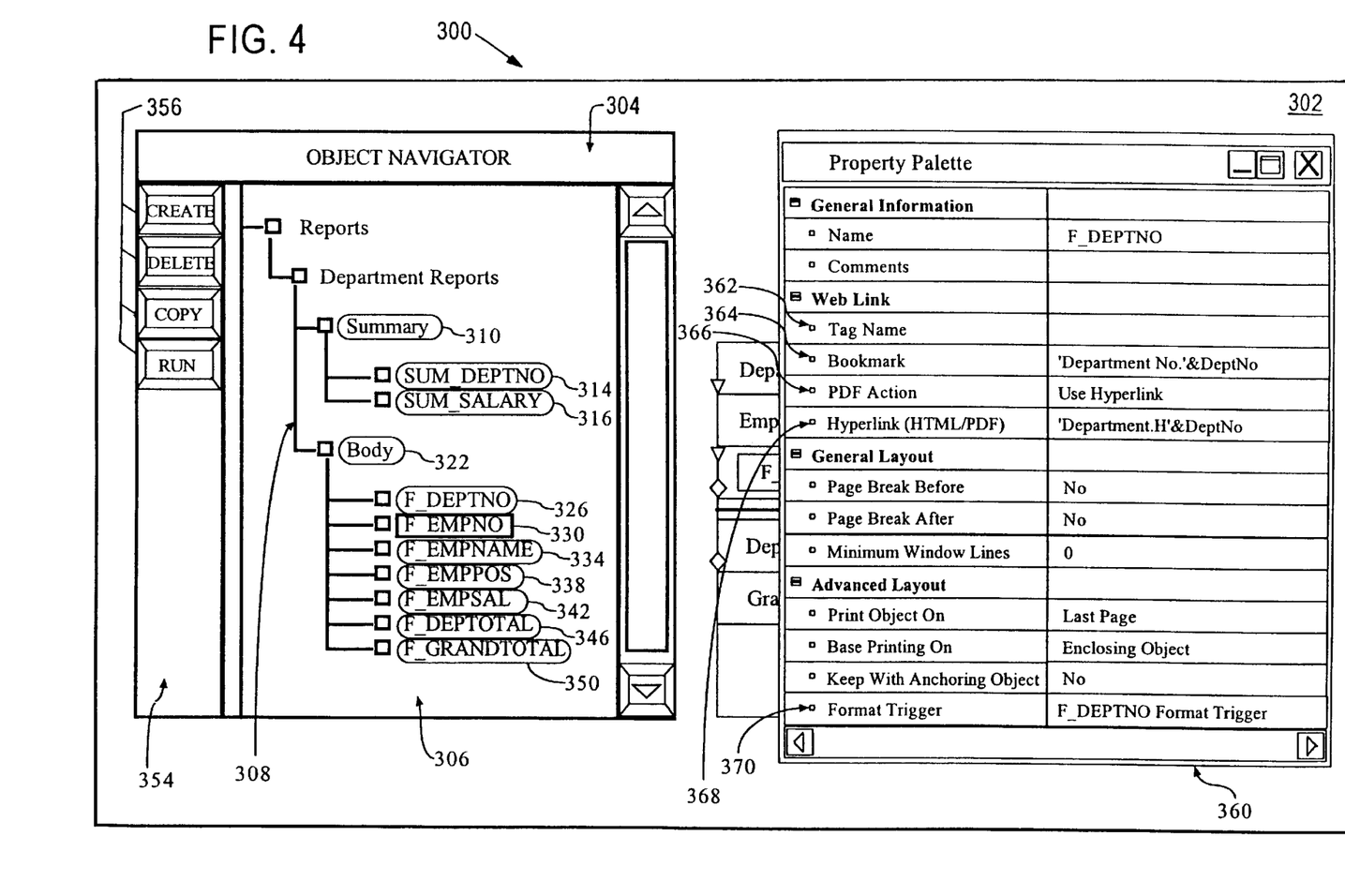
FIG. 4 is a block diagram illustrating a property palette associated with the report builder tool of FIG. 3.

FIG. 4 illustrates a property palette 360 listing the object attributes for report object F_DEPTNO 330, which has been selected from hierarchical tree 308. According to one embodiment of the invention, the object attributes include four "Web Link" attributes, which specify hypertext characteristics of report object F_DEPTNO 330. Tag name attribute 362 provides the capability for a user to specify the name of a link tag to be included in the portion of the report associated with the report object. The link tag can then be referenced from other locations in the report.

A bookmark attribute 364 provides the capability for a user to specify an outline entry for a report object. The outline entry contains the text or other information specified by bookmark attribute 364. For example, in FIG. 4, bookmark attribute 364 specifies "Department Number &DeptNo," which when processed by a report engine, causes an outline entry to be generated for each department. Each outline entry includes the text "Department Number" followed by the department number. Each outline entry also includes a link to the portion of the report associated with this report object, which in this example, contains the information for that department. If a tag name has been specified by the user via tag name attribute 362, then the link in the outline entry references the tag name. Otherwise, if a tag name attribute 362 was not specified, then a link tag is automatically generated and referenced by the outline entry.

A PDF action attribute 366 is a flag with two choices. The first choice is to enter a PDF command line entry which is executed by a PDF viewer when the portion of the report corresponding to this report object is selected. Typically, a user will specify a command line which, when executed, launches an application. If a PDF action attribute 366 is specified, then hyperlink attribute 368 is not used.

The second choice for PDF action attribute 366 is for a user to select "Use Hyperlink" and not enter a PDF command line entry. In this case, a user may specify a link for this report object. The link may reference a location within the report or another document (a hyperlink). When the portion of the report corresponding to this report object is selected by a user, the hypertext viewer used to view the report will scroll the report to the referenced location or, if the link referenced another document, load the referenced document.

For example, suppose for report object F_DEPTNO 326, a user specifies "Use Hyperlink" for PDF action attribute 366 and then specifies "Dept Tot Tag & Dept No" for hyperlink attribute 368. When report object F_DEPTNO 326 is processed by a report engine, hyperlink attribute 368 causes the report engine to generate a set of links referencing "Dept Tot Tag &Dept No" and places these links in the report at the portions of the report associated with the DEPTNO report object. Essentially, this value for hyperlink attribute 368 causes each department heading in the report to include a link to a link tag associated with that department heading.

Figure 5:
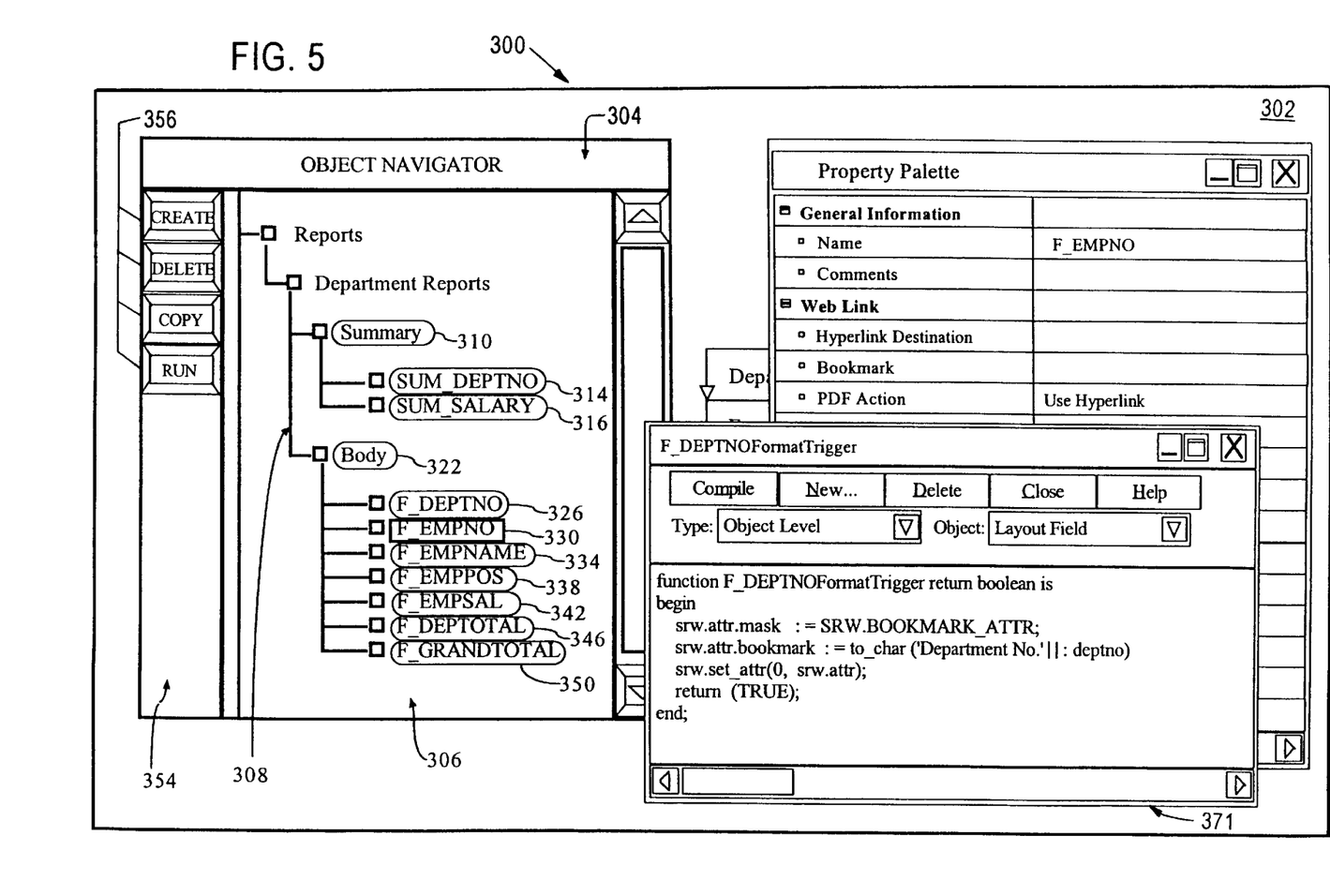
FIG. 5 is a block diagram illustrating a format trigger associated with the report builder tool of FIG. 3.

More sophisticated hypertext attributes may be specified through a format trigger attribute 370. Selecting format trigger attribute 370 causes a format trigger entry screen to be displayed for that field. FIG. 5 illustrates the format trigger entry screen 371 for report object F_DEPTNO 330. According to one embodiment of the invention, format trigger screen 371 for report object F_DEPTNO 330 provides the capability for a user to enter code which specifies the contents of an outline entry for this field. The code allows functions to be applied to the data which is ultimately displayed in the outline for the field F_DEPTNO 332. The code entered in format trigger screen 371 may be in any language supported by the report builder tool 300. The illustrated code is PL/SQL, which is generally available from Oracle Corporation.

The web link attributes provided by the invention are not mutually exclusive. That is, a user may specify one or more of the web link attributes previously described in various combinations depending upon the desired results. For example, for a given report object, a user may specify a tag name (via tag name attribute 362), a bookmark (via bookmark attribute 364), and a link (via "hyperlink" attribute 368). When this report object is processed by a report engine, a link tag specified by tag name attribute 362 will be included in the portion of the report associated with this report object. Also, an outline entry will be generated as specified by bookmark attribute 364 which includes a link to the link tag specified by tag name attribute 362. Finally, the portion of the report associated with this report object will contain a link to the location specified by hyperlink attribute 368. Other combinations of web link attributes may also be used.

According to another aspect of the invention, a report definition may include field repeat indicators to specify to the report engine that a field or group of fields should be applied to all values in the database for that data type. For example, the report definition illustrated in FIG. 3 includes a field repeat indicator 372 in frame 312. Field repeat indicator 372 consists of a rectangle containing a downward pointing triangle enclosing both report field SUM_DEPTNO 318 and report field SUM_SALARY 320.

Figure 8:
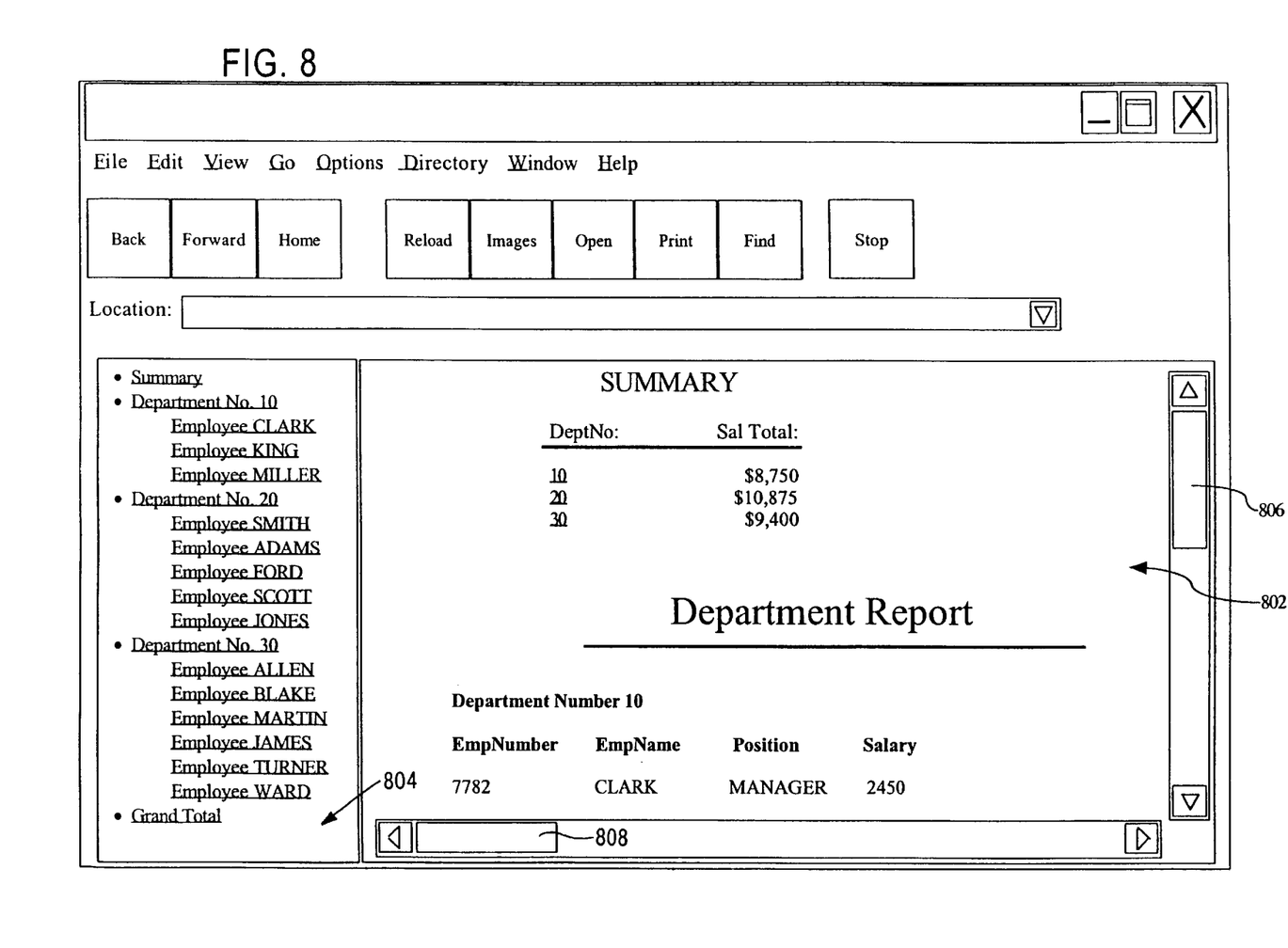
FIG. 8 illustrates the output from a hypertext viewer according to an embodiment of the invention.

When processed by a report engine, field repeat indicator 372 causes the report engine to list all department numbers and the salary total for each department. Similarly, based upon field repeat indicators 374, all employees within a department will be reported and, based upon field repeat indicators 378, all departments will be reported. The results of processing the report definition illustrated in FIG. 3 with a report engine are illustrated in FIG. 8 and described in more detail hereinafter.

2. Processing a Report Definition With a Report Engine

According to an embodiment of the invention, a report definition in report builder tool 300 is processed when a user selects the RUN function button 356. This initiates execution of a report engine which processes each report object specified by the current report definition against a database and creates a report file containing a report. The report file is of the form specified by the user during the creation or running of the report definition. For example, a user may specify that the report file be in Hypertext Markup Language (HTML) format so that the report file may be read by a type of hypertext viewer known as a "web browser," or in or Portable Document Format (PDF) which is readable by Adobe Acrobat. Such a report file may also include code for generating an outline associated with the report based upon the attributes specified for the report fields in the report definition.

Figure 6A:
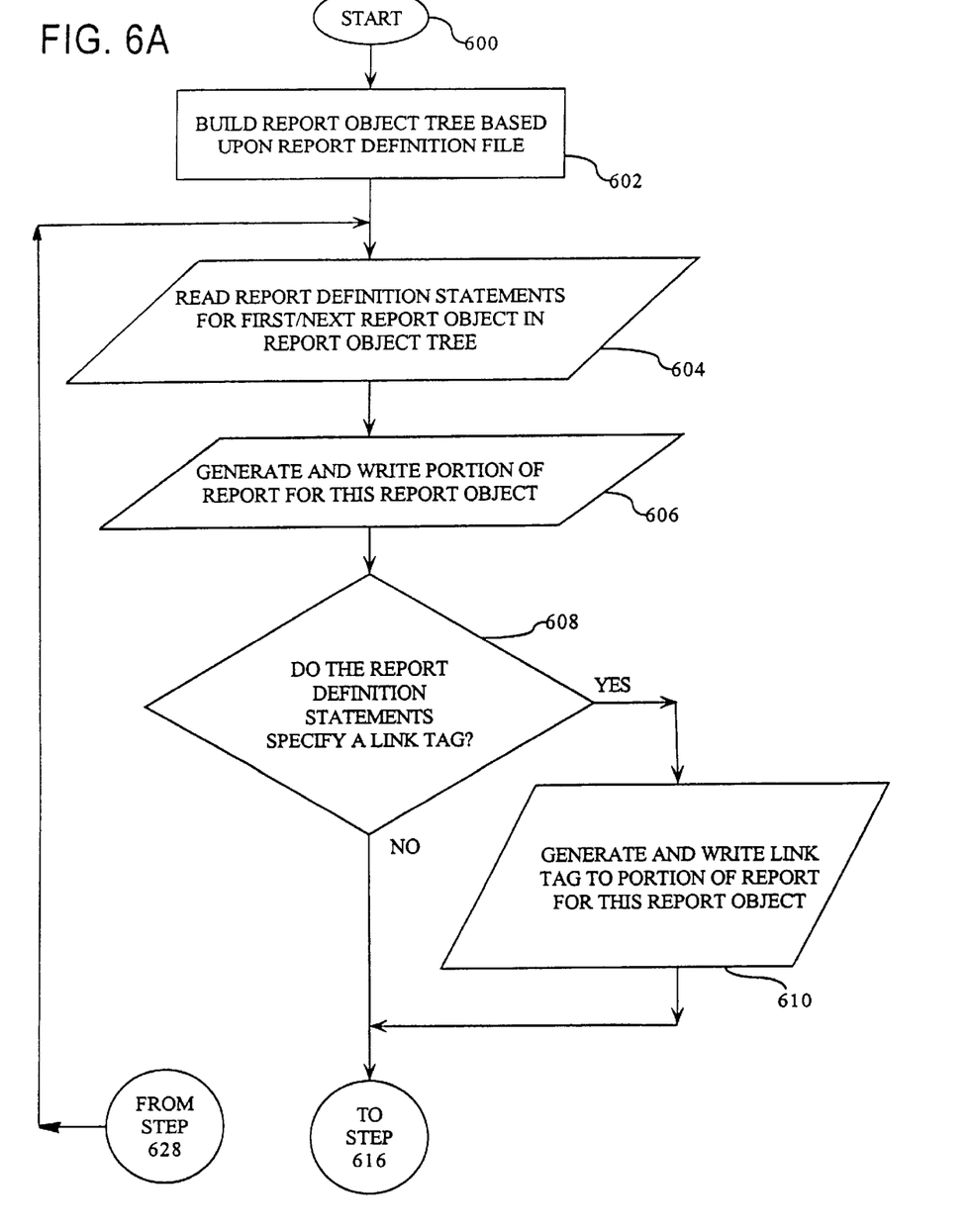
FIGS. 6A, 6B and 6C comprise a flow chart illustrating a method for generating a hypertext-based outline according to an embodiment of the invention.
Figure 6B:
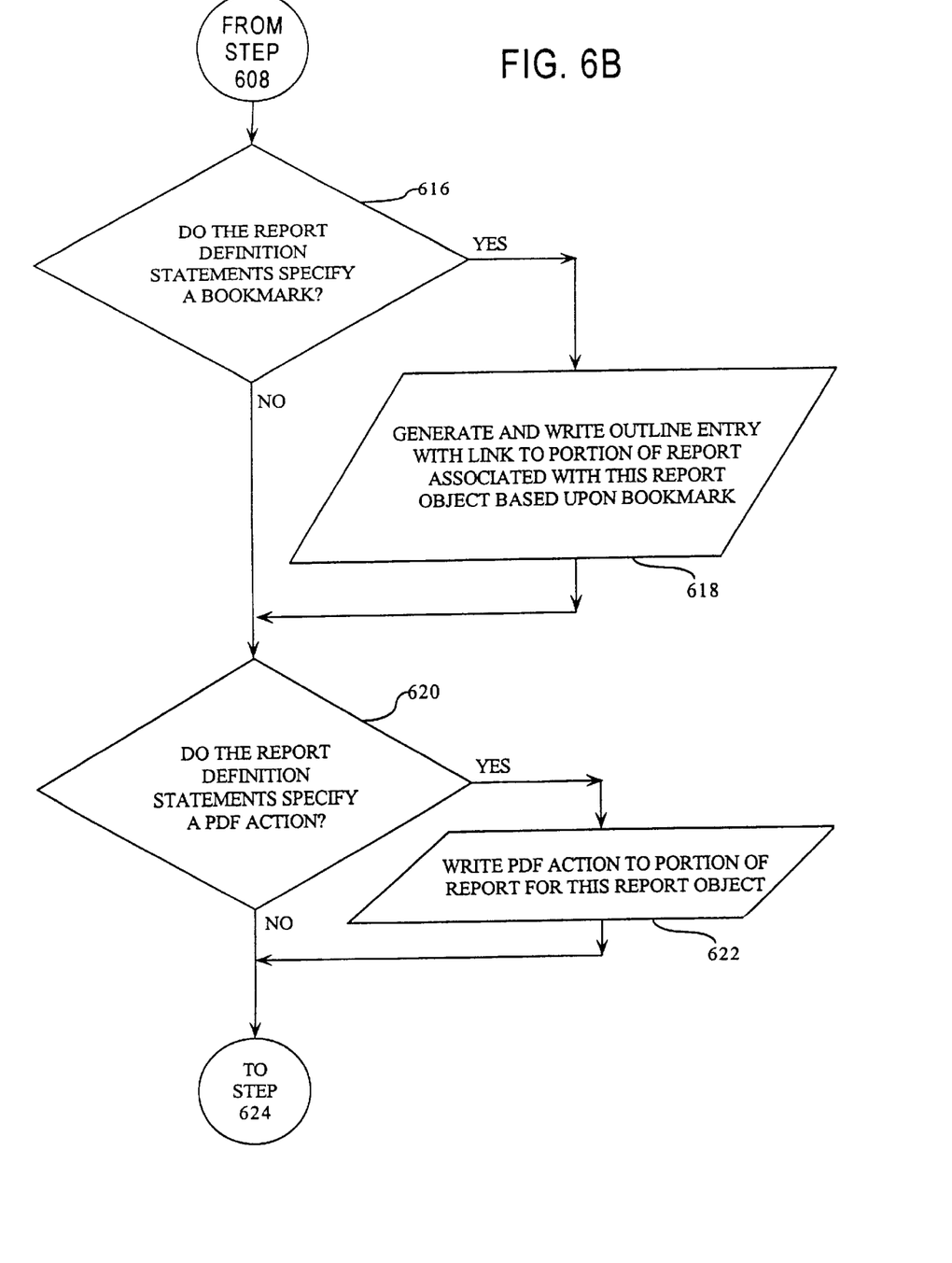
Figure 6C:
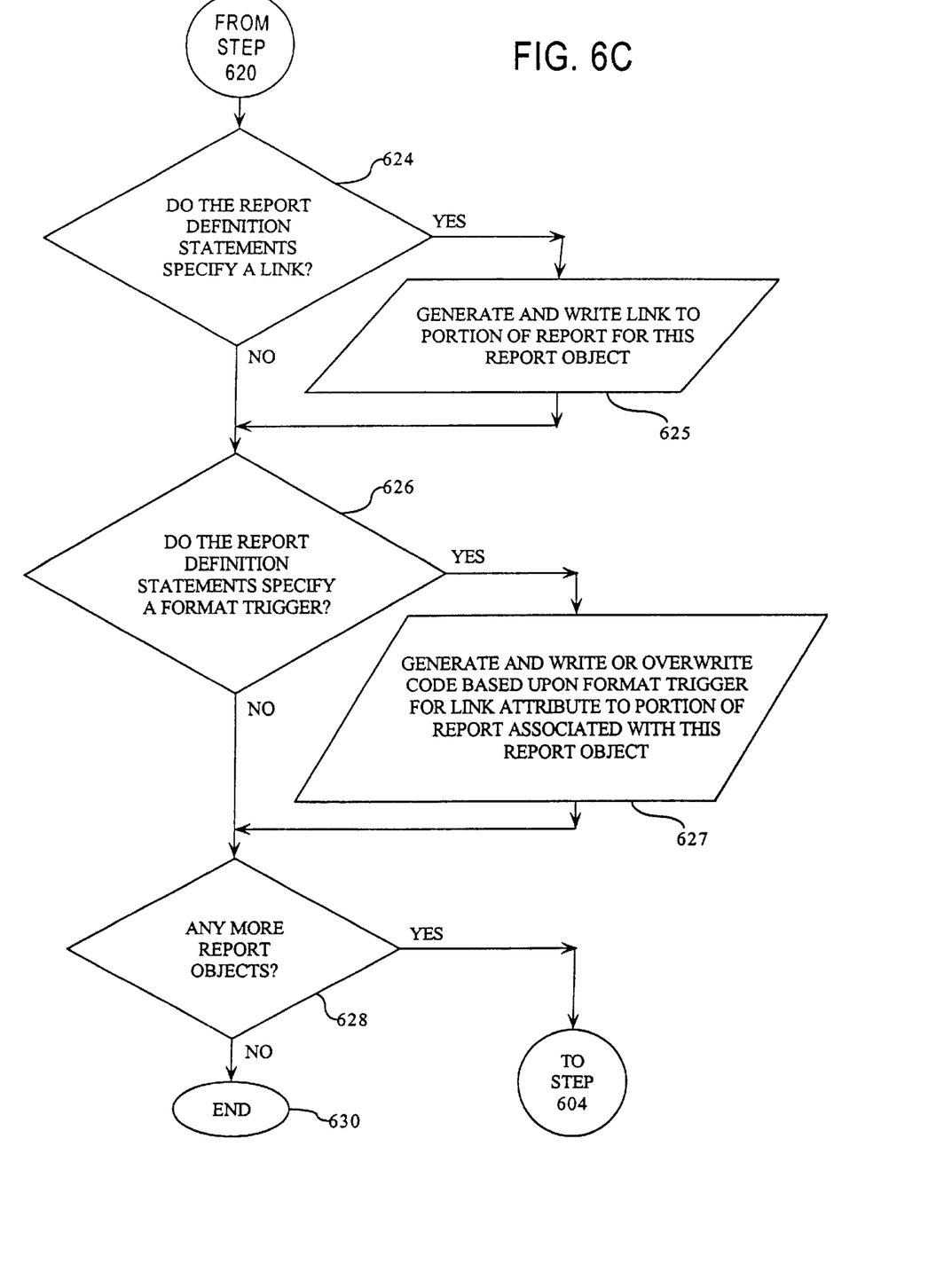
Figure 7:
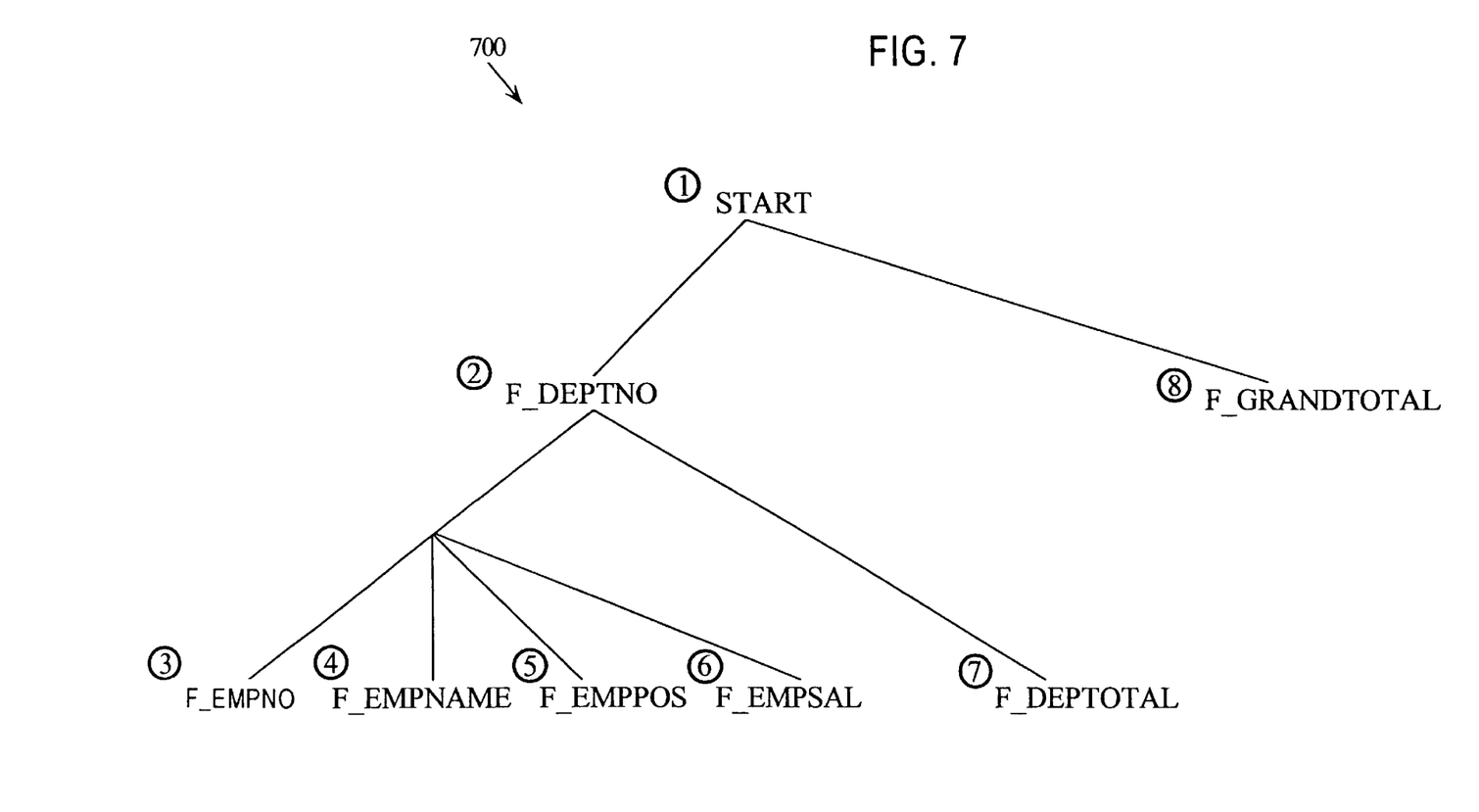
FIG. 7 is a report object tree according to an embodiment of the invention.

The steps involved in processing a report definition to generate a report and a hypertext-based outline for the report according to one embodiment of the invention are now described with reference to the block diagram of FIG. 3 and the flowchart of FIGS. 6A, 6B and 6C. After starting in step 600, in step 602 a report object tree is built based upon the report definition file. A report object tree 700, based upon the report fields contained in frame 324 of FIG. 3, is illustrated in FIG. 7. The purpose of report object tree 700 is to establish an order for processing the report objects contained in the report definition file based upon the top down and left-to-right physical positioning of the report objects in report builder tool 300. The processing order of the report object fields in report object tree 700 is indicated next to each field. For example, since F_DEPTNO 328 is contained in a frame with field repeat indicator 378, all departments will be processed before F_GRANDTOTAL 352 is processed. Similarly, all of the employees for each department will be processed based upon the frame and field repeat indicator 374 which surrounds fields F_EMPNO 332, F_EMPNAME 336, F_EMPPOS 340 and F_EMPSAL 344, before the department total field F_DEPTOTAL 348 is processed.

In step 604, report definition statements for the first report object are read from the report definition file. The report definition statements for the first report object reflect all of the attributes of the first report object. In step 606, the report definition statements for this report object are processed against a database, which causes the portion of the report associated with this report object to be generated and written to the report file.

Then, in step 608, a determination is made as to whether the report definition statements for this report object specify a link tag, based upon tag name attribute 362. If so, then a link tag specified by tag name attribute 362 is generated and written to the portion of the report corresponding to this report object.

In step 616, a determination is made as to whether the report definition statements for this report object specify a bookmark. If so, then in step 618, report code necessary for an outline entry having a link to the portion of the report associated with this report object is generated and written to the report file. For example, bookmark attribute 364 of FIG. 4 specifies a bookmark of "'Department No.'&DeptNo." This bookmark specifies that an outline entry containing the text string "Department No." followed by the department number is to be generated for each department. Each of these outline entries (departments) includes a link to the portion of the report corresponding to that outline entry (department), so that when the report file is processed by a hypertext viewer, selecting an outline entry causes the hypertext viewer to scroll to the portion of the report corresponding to that outline entry. Note that according to an embodiment of the invention, format trigger attribute 370 has a higher priority than bookmark attribute 364. Since both of these attributes affect the generation of outline entries and format trigger attribute 370 provides more sophisticated functionality, bookmark attribute 364 is only used if format trigger attribute 370 does not specify a bookmark.

Then, in step 620, a determination is made as to whether the report definition statements for this report object specify a PDF action. If so, then in step 622, then the PDF action is written to the portion of the report corresponding to this report object. Typically, the PDF action specifies a command line entry which will be executed when the portion of the report corresponding to this report object is selected by the user.

Then, in step 624, a determination is made as to whether the report definition statements for this report object specify a link. If so, then in step 625, a link referencing the location specified in "hyperlink" attribute 368 is written to the portion of the report corresponding to this report object. For example, referring again to FIG. 4, "hyperlink" attribute 368 specifies a link to "Department.H&DeptNo." When processed by a report engine, this report object attribute causes a link, referencing the document "Department.HXX," where XX is the department number, to be generated and stored in the report file at the portion of the report associated with this report object. Selecting this link in a hypertext viewer causes the hypertext viewer to load the document specified by the link. In this example, the "Department.HXX" document may contain other department information which will be displayed to the user.

In step 626, a determination is made as to whether the report definition statements for this report object specify a format trigger. If so, then in step 627, report code necessary to generate an outline entry having a link to the portion of the report associated with this report object, based upon the format trigger, is generated and written to the report file. According to one embodiment of the invention, format trigger attribute 370 has a higher priority than the other web link attributes 362, 364, 366. Consequently, the code generated as a result of a specified format trigger 370 overwrites code generated based upon the other web link attributes 362, 364, 366.

Then, in step 628, a determination is made as to whether any more report objects in the report object tree need to be processed. If so, then processing returns to step 604. Otherwise, the processing of a report definition file according to an embodiment of the invention is completed in step 630.

3. Viewing a Report and Hypertext-based Outline With a Hypertext Viewer

Once a report definition has been processed by a report engine to create a report file, the report file may be stored on a non-volatile storage medium, printed or reviewed using a file viewer compatible with the file type. If the report definition specified an HTML or PDF type output file, then the file is typically viewed with a hypertext viewer. The specific hypertext viewer will depend on the specific hypertext language selected. For example, if the file is in HTML format, then a web browser is used. If the file is in PDF format, then a PDF reader such as Adobe Acrobat is used.

Figure 9:
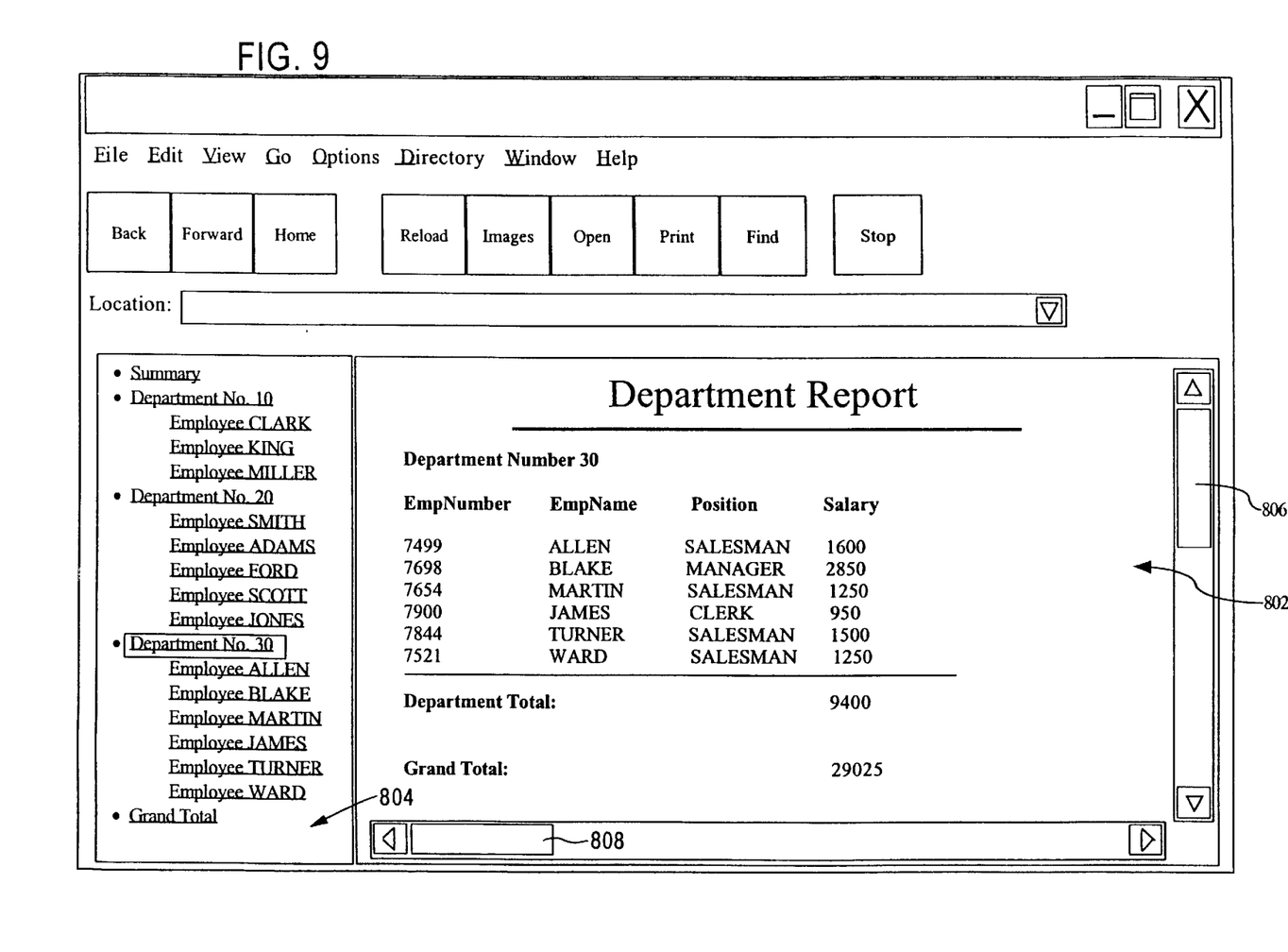
FIG. 9 illustrates the output from a hypertext viewer according to an embodiment of the invention.

In the example illustrated in FIGS. 3 through 5, the output file is designated to contain HTML code and include an outline. As illustrated in FIG. 8, when viewed with a hypertext viewer, such as a web browser, the body of the document is displayed in display frame 802, while the outline is displayed in display frame 804. The body of the report may be scrolled vertically and horizontally using scroll bars 806, 808, respectively. Alternatively, a user may select any of the outline entries displayed in display frame 804 and the hypertext viewer will automatically scroll the body of the report in display frame 802 to the location within the report specified by the selected outline entry. For example, selecting the "Department No. 30" outline entry causes the hypertext viewer to scroll the portion of the report displayed in display frame 802 to the section containing the report for department 30 as illustrated by FIG. 9. In other embodiments, the portion of the report displayed in display frame 802 may also contain links to other documents. Selecting a link to another document causes the hypertext viewer to load and display the specified document.

Although in the present example illustrated in FIGS. 8 and 9 the amount of information for each employee occupies only a single line and roughly corresponds to each outline entry, in some instances the employee information may be extensive, occupying several pages of text. In such cases, the convenience and flexibility provided by the outline is fully realized.

The automatic generation of hypertext outlines using the techniques described herein provides several advantages over prior approaches to generating hypertext-based outlines for documents. First, the hypertext-based outline is displayed in a separate display frame from the display frame containing the body of the report, ensuring that the outline is always visible to the user. The hypertext-based outline provides random access into the report from any location within the report without having to return to the beginning of the report. Most importantly, the contents of the hypertext-based outline are based upon the report definition and only need to be defined once when the report definition is created, or when the report definition is modified. Every time a report definition is processed by a report engine to create a new report, a new hypertext-based outline including links, is automatically generated for that report.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for automatically generating an outline for a document, both the outline and the document being based upon data that specifies the content and format of both the document and the outline the method comprising the computer-implemented steps of:

a) receiving the data that specifies the content and format of both the document and the outline;

b) determining based upon the data that specifies the content and format of both the document and the outline whether an outline entry is to be generated; and c) if, based upon the data that specifies the content and format of both the document and the outline, an outline entry is to be generated, then generating, based upon the data that specifies the content and format of both the document and the outline, an outline entry with a link to a location specified by the data that specifies the content and format of both the document and the outline.

2. The method of claim 1, further comprising the step of generating the data that specifies the content and format of both the document and the outline based upon desired contents of both the outline and the document.

3. The method of claim 1, wherein the step of generating, based upon data that specifies the content and format of both the document and the outline, an outline entry with a link to a location specified by the data that specifies the content and format of both the document and the outline further comprises the step of generating, based upon data that specifies the content and format of both the document and the outline, an outline entry with a link to a portion of the document generated based upon the data that specifies the content of both the document and the outline.

4. The method of claim 1, wherein the step of generating, based upon data that specifies the content and format of both the document and the outline, an outline entry with a link to a location specified by the data that specifies the content of both the document and the outline further comprises the step of generating, based upon data that specifies the content and format of both the document and the outline, an outline entry with a link to the document specified by the data that specifies the content and format of both the document and the outline.

5. The method of claim 1, wherein the step of determining based upon the data that specifies the content and format of both the document and the outline whether an outline entry is to be generated further comprises the step of examining attributes of a document definition field associated with the data that specifies the content and format of both the document and the outline.

6. The method as recited in claim 1, wherein the step of generating, based upon the data that specifies the content and format of both the document and the outline, an outline entry with a link to a location specified by the data that specifies the content and format of both the document and the outline is performed before the document is generated.

7. The method as recited in claim 1, wherein the step of generating, based upon the data that specifies the content and format of both the document and the outline, an outline entry with a link to a location specified by the data that specifies the content and format of both the document and the outline is performed during the generation of the document.

8. The method as recited in claim 1, wherein the location is a location in a document other than the document that is based upon the data that specifies the content and format of both the document and the outline.

9. A method for automatically generating both a hypertext-based report and a hypertext-based outline associated with the hypertext-based report, both the hypertext-based report and the hypertext-based outline being based upon a report definition, the method comprising the computer-implemented steps of:

a) receiving the report definition, the report definition comprising a plurality of report definition statements;

b) selecting one of the report definition statements from the report definition;

c) generating a portion of the hypertext-based report based upon the selected report definition statement;

d) determining whether the selected report definition statement specifies that a hypertext-based outline entry is to be generated;

e) if the selected report definition statement specifies that a hypertext-based outline entry is to be generated, then generating, based upon the selected report definition statement, a hypertext-based outline entry with a link to a location specified by the selected report definition statement; and f) repeating steps b) through e) until all report definition statements have been selected.

10. The method of claim 9, further comprising the step of generating the report definition based upon desired contents of both the hypertext-based report and the hypertext-based outline.

11. The method of claim 9, wherein the step of generating a hypertext-based outline entry with a hyperlink to a location specified by the selected report definition statement further comprises the step of if the selected report definition statement specifies that a bookmark is to be generated, then generating an outline entry with a hyperlink to the portion of the hypertext-based report generated based upon the selected report definition statement.

12. The method of claim 9, wherein the step of determining whether the selected report definition statement specifies that a hypertext-based outline entry is to be generated further comprises the step of examining attributes of a report definition field associated with the selected report definition statement.

13. A computer-readable medium carrying one or more sequences of one or more instructions for generating an outline for a document, wherein both the outline and the document are based upon data that specifies the content and format of both the document and the outline, the one or more sequences of one or more instructions including sequences of instructions which, when executed by one or more processors, cause the one or more processors to perform the steps of:

a) receiving the data that specifies the content and form of both the document and the outline;

b) determining based upon the data that specifies the content and form of both the document and the outline whether an outline entry is to be generated; and c) if, based upon the data that specifies the content and form of both the document and the outline, an outline entry is to be generated, then generating an outline entry with a link to a location specified by the data that specifies the content and form of both the document and the outline.

14. The computer-readable medium of claim 13, wherein the computer-readable medium further includes instructions for generating the data that specifies the content and format of both the document and the outline based upon desired contents of both the outline and the document.

15. The computer-readable medium of claim 13, wherein the step of generating, based upon data that specifies the content and format of both the document and the outline, an outline entry with a link to a location specified by the data that specifies the content and format of both the document and the outline further comprises the step of generating, based upon data that specifies the content and format of both the document and the outline, an outline entry with a link to a portion of the document generated based upon the data that specifies the content and format of both the document and the outline.

16. The computer-readable medium of claim 13, wherein the step of generating, based upon data that specifies the content and format of both the document and the outline, an outline entry with a link to a location specified by the data that specifies the content and format of both the document and the outline further comprises the step of generating, based upon data that specifies the content and format of both the document and the outline, an outline entry with a link to the document specified by the data that specifies the content and format of both the document and the outline.

17. The computer-readable medium of claim 13, wherein the step of determining based upon the data that specifies the content and format of both the document and the outline whether an outline entry is to be generated further comprises the step of examining attributes of a document definition field associated with the data that specifies the content and format of both the document and the outline.

18. A computer system having a storage medium with a report definition stored thereon for generating a report and a hypertext-based outline for the report, the report definition comprising:

a) a first set of data specifying the contents and form of the report; and b) a second set of data specifying the contents of the hypertext-based outline for the report, the hypertext-based outline containing a link to a location specified by the second set of data.

19. The computer system of claim 18, wherein the second set of data further includes at least one bookmark, each bookmark being associated with an entry in the hypertext-based outline and specifying a location within the report.

20. The computer system of claim 18, wherein the second set of data further includes at least one hyperlink, each hyperlink being associated with an entry in the hypertext-based outline and specifying a document other than the report.

* * * * *